(12) United States Patent
Barrass et al.

(10) Patent No.: US 10,985,686 B2
(45) Date of Patent: Apr. 20, 2021

(54) METHODS AND APPARATUS FOR THE PROVISION OF AC POWER

(71) Applicant: Sevcon Limited, Gateshead (GB)

(72) Inventors: Peter Barrass, Gateshead (GB); David Sandells, Gateshead (GB)

(73) Assignee: Sevcon Limited, Gateshead (GB)

( * ) Notice: Subject to any disclaimer, the term of this patent is extended or adjusted under 35 U.S.C. 154(b) by 329 days.

(21) Appl. No.: 16/304,194

(22) PCT Filed: May 23, 2017

(86) PCT No.: PCT/GB2017/051443
§ 371 (c)(1),
(2) Date: Nov. 23, 2018

(87) PCT Pub. No.: WO2017/203236
PCT Pub. Date: Nov. 30, 2017

(65) Prior Publication Data
US 2019/0214932 A1 Jul. 11, 2019

(30) Foreign Application Priority Data

May 24, 2016 (GB) .................................. 1609123.3

(51) Int. Cl.
*H02P 27/08* (2006.01)
*B60L 3/12* (2006.01)
(Continued)

(52) U.S. Cl.
CPC ............... *H02P 27/08* (2013.01); *B60L 3/12* (2013.01); *B60L 50/30* (2019.02); *B60L 58/22* (2019.02);
(Continued)

(58) Field of Classification Search
USPC ......................................................... 318/560
See application file for complete search history.

(56) References Cited

U.S. PATENT DOCUMENTS 3,697,843 A * 10/1972 Riess .................. H02M 7/5155
318/758
3,701,001 A * 10/1972 Riess .................. H02M 7/5155
363/138
(Continued)

FOREIGN PATENT DOCUMENTS

| CN | 104 953 675 A | 9/2015 |
| CN | 105 437 995 A | 3/2016 |

(Continued)

*Primary Examiner* — Bentsu Ro
(74) *Attorney, Agent, or Firm* — Woodard Emhardt Henry Reeves & Wagner LLP

(57) ABSTRACT

A unit for installation in a complex product comprising an electric machine requiring an AC power supply. The unit comprises: a housing carrying an AC output; a battery in the housing comprising at least one battery cell; an inverter in the housing, the inverter comprising a plurality of voltage controlled impedances, VCIs, for providing a power supply to the AC output based on energy from the battery; wherein the housing carries a timing signal input configured to receive a timing signal from outside the housing; and wherein the timing signal input is coupled to control the VCIs so that changes in the impedances of the VCIs are synchronised with the timing signal.

19 Claims, 9 Drawing Sheets

(51) Int. Cl.
  *B60L 50/30* (2019.01)
  *B60L 58/22* (2019.01)
  *H02P 27/06* (2006.01)
(52) U.S. Cl.
  CPC .......... *H02P 27/06* (2013.01); *B60L 2240/547* (2013.01); *Y02T 10/64* (2013.01); *Y02T 10/70* (2013.01)

(56) References Cited

U.S. PATENT DOCUMENTS

| | | | | |
|---|---|---|---|---|
| 4,204,268 | A | * | 5/1980 | Vivirito ................ H02M 7/517 363/135 |
| 4,615,000 | A | * | 9/1986 | Fujii ................ H02M 7/53873 318/811 |
| 5,272,615 | A | * | 12/1993 | Wert ...................... H02M 7/48 363/41 |
| 2009/0294189 | A1 | | 12/2009 | Kim et al. |
| 2011/0014501 | A1 | | 1/2011 | Scheucher |
| 2012/0313431 | A1 | | 12/2012 | Shum et al. |
| 2013/0147404 | A1 | | 6/2013 | Kim |
| 2013/0181519 | A1 | | 7/2013 | Lee |
| 2014/0077731 | A1 | | 3/2014 | Kuwano |
| 2014/0210419 | A1 | | 7/2014 | Kim |
| 2015/0044520 | A1 | | 2/2015 | Feuerstack |
| 2015/0191102 | A1 | | 7/2015 | Kubo |
| 2015/0239365 | A1 | * | 8/2015 | Hyde .................... B60L 58/26 701/2 |
| 2016/0118922 | A1 | | 4/2016 | Rauscher |
| 2016/0126515 | A1 | | 5/2016 | Hill |

FOREIGN PATENT DOCUMENTS

| | | |
|---|---|---|
| DE | 102010026608 | 1/2012 |
| JP | 2003086157 | 3/2003 |

* cited by examiner

METHODS AND APPARATUS FOR THE PROVISION OF AC POWER

The present disclosure relates to methods and apparatus for the provision of alternating current, AC, power from stored direct current, DC, energy such as may be provided by batteries, fuel cells and other DC energy storage apparatus.

Batteries are used in a variety of applications, from powering electric machines to storing energy. In many such applications, such as for powering electric machines, there is a need for high energy density to enable compact batteries to handle a large power demand. The drive for miniaturisation of products and the need for extended battery life represent significant challenges in this respect. Large quantities of energy need to be stored in ever smaller volume. The same is true of other DC energy storage apparatus such as fuel cells.

High performance batteries may require careful handling to protect them from mechanical shock and may also benefit from careful electrical management. To improve battery performance and extend battery life of such batteries the level of charge may need to be carefully balanced between cells. This may require knowledge of individual cell voltages and/or states of charge and other localised measurement of battery parameters. High performance batteries therefore tend increasingly to require sophisticated battery management systems. These may add significant cost, so there is a trend toward providing large numbers of cells in as small a space as possible (to increase energy density), and managing the cells with a single battery management system. This has been thought to increase energy density and it reduces cost. As an added advantage, this may simplify the connections and sensing communications between the battery cells and the BMS. This may enable a single BMS to balance large numbers of cells accurately, thereby prolonging battery life, and it may do so without adding unduly to the volume occupied by the battery cells themselves.

An inverter may be used to convert DC into AC and vice-versa. Such inverters need to be precisely controlled, both to promote efficiency and to give high speed performance. Particularly in electric motor applications, the output of an inverter may need to offer sub-microsecond timing accuracy across multiple AC phases. In traction motor applications, such as in hybrid and electric vehicles, and in generator systems each phase leg of the inverter may need to be rated for very high currents. Accordingly, the cost of the inverter itself may rise. As with battery management systems, the need for precise control and the need to reduce component cost has led people to believe that the provision of a single inverter bridge with multiple inverter legs (one for each phase of the desired AC) is a cost efficient and compact way to provide inverter functionality. The general prejudice in the art therefore has been that the provision of a multi-phase inverter in a single discrete separate unit, and a single battery management system which controls operation of large number of high performance battery cells to supply power to that single unit aids miniaturisation, improves battery life and reduces cost.

The present disclosure however offers a different approach which contradicts these prejudices and goes against conventional thinking in the art. Aspects and examples of the present disclosure are set out in the appended claims.

A specific description of some embodiments is provided, by way of non-limiting example only, with reference to the accompanying drawings, in which.

The present disclosure has a number of interrelated applications. Some of these are summarised below.

Figure 1:
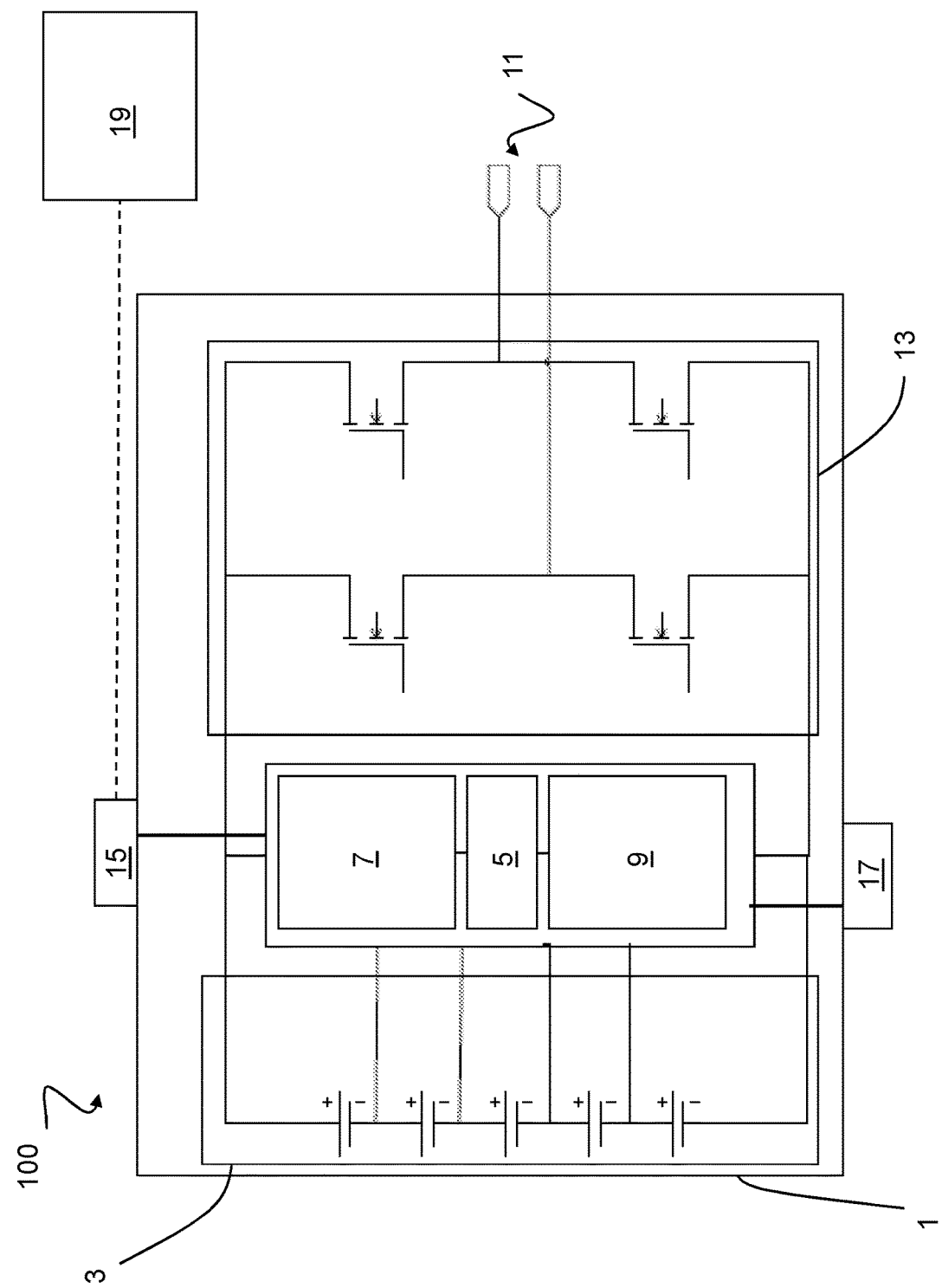
FIG. 1 shows a schematic of an example unit for installation in a complex product.

FIG. 1 illustrates some embodiments of the present disclosure which provide a unit 100 for installation in a complex product. Each unit may comprise DC energy storage, such as a battery of energy storage cells which may be managed by a battery management system. These units may also comprise an inverter for providing an AC output from the unit. The output of a plurality of these units 100 may be coupled together, for example in series, for example to act as a string cell inverter to provide AC energy. Each of the units may be interchangeable in the sense that any one of the units 100 may be replaced by another similar such unit. Each such unit may be provided in a separate housing to aid its installation into a complex product. The complex product may comprise a plurality of separate compartments, which may be of different and/or irregular shapes. The units, 100 may be installed into these separate compartments and connected together. Although the total space occupied by the battery and inverter as a whole may increase, such embodiments may permit the complex product as a whole to be reduced in size by the more efficient use of space.

The complex product may also comprise a compartment for an electric machine, and the electric machine may require an AC power supply. The electric machine may comprise a multi-phase AC electric motor, such as a traction motor, and may be provided as a part of the product. It will be appreciated in the context of the present disclosure that a "complex product" may be any apparatus which comprises components assembled together. Those components may be made and sold separately, for example as spare parts, or as components to be assembled together to provide the full working product. In some complex products, some components may not be visible during normal use. For example: electric and hybrid vehicles, generators, industrial scale energy storage units, engines, vacuum cleaners, hand dryers, drones, robots and autonomous vehicles all provide examples of complex products, but of course there are others too.

The present disclosure also provides a control logic 5, 19 for controlling the units. For example, the control logic 5, 19 may control the output from each of a plurality of such units described above based on at least one of: a desired power; a desired torque; and/or battery data of each of the units.

In some embodiments illustrated by FIG. 1, each unit 100 comprises a housing carrying an AC output. A battery, a battery management system and an inverter are provided in the housing. The inverter comprises a plurality of voltage controlled impedances, VCIs, for providing a power supply to the AC output based on energy from the battery. In some embodiments the housing carries a timing signal input configured to receive a timing signal from outside the housing. In such embodiments the timing signal input is coupled to control the impedances of the VCIs so that changes in the impedances of the VCIs are synchronised with the timing signal.

Figure 5:
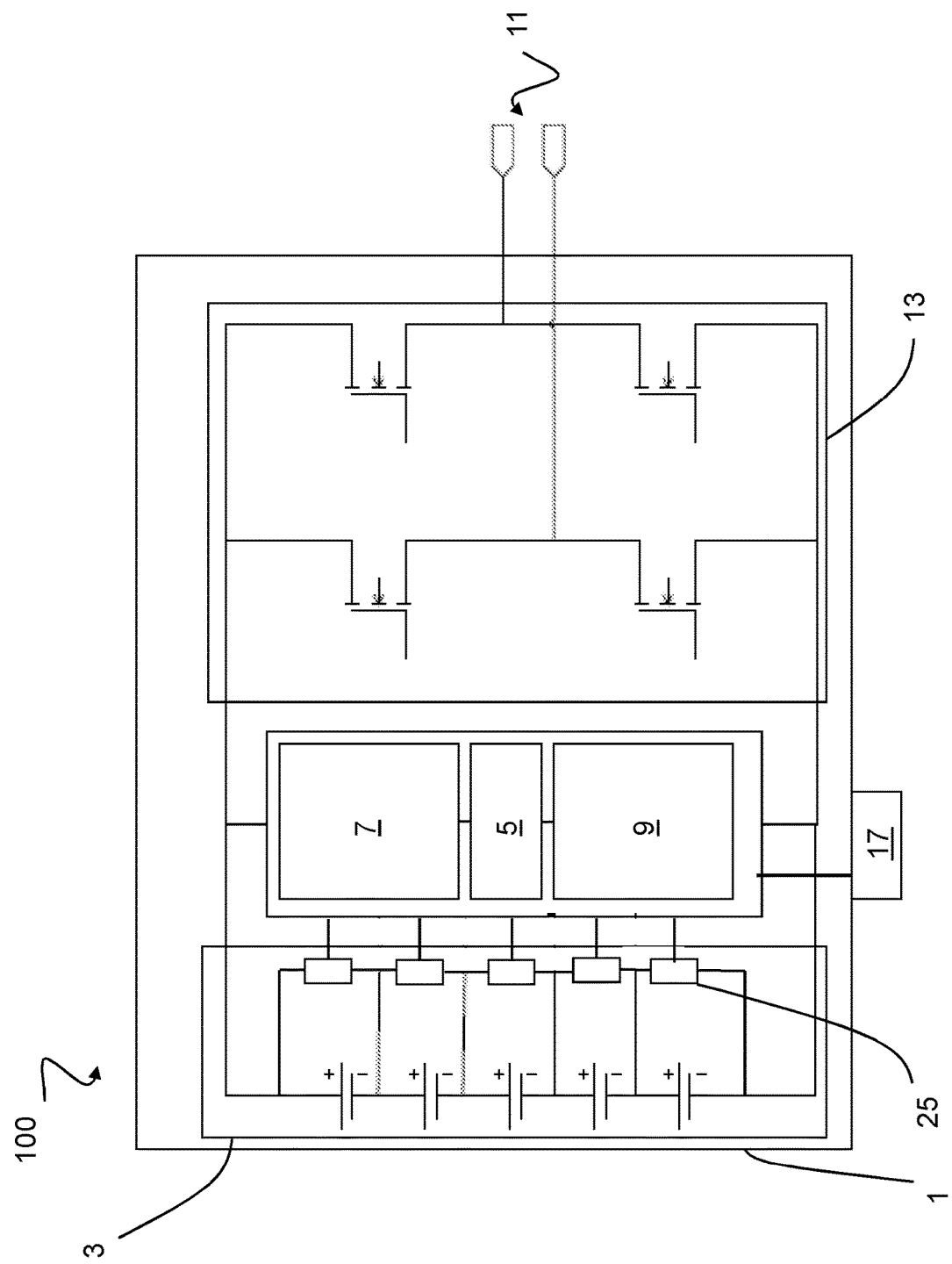
FIG. 5 shows a schematic of another example unit for installation in a complex product.

As illustrated in FIG. 5, in some embodiments of the disclosure, the battery management system also comprises at least one VCI 25. The housing carries a DC input for coupling to a DC power supply outside the housing. A controller is provided in the housing and is configured to operate at least one VCI of the inverter and the at least one VCI of the battery management system using the DC power supply.

Figure 2:
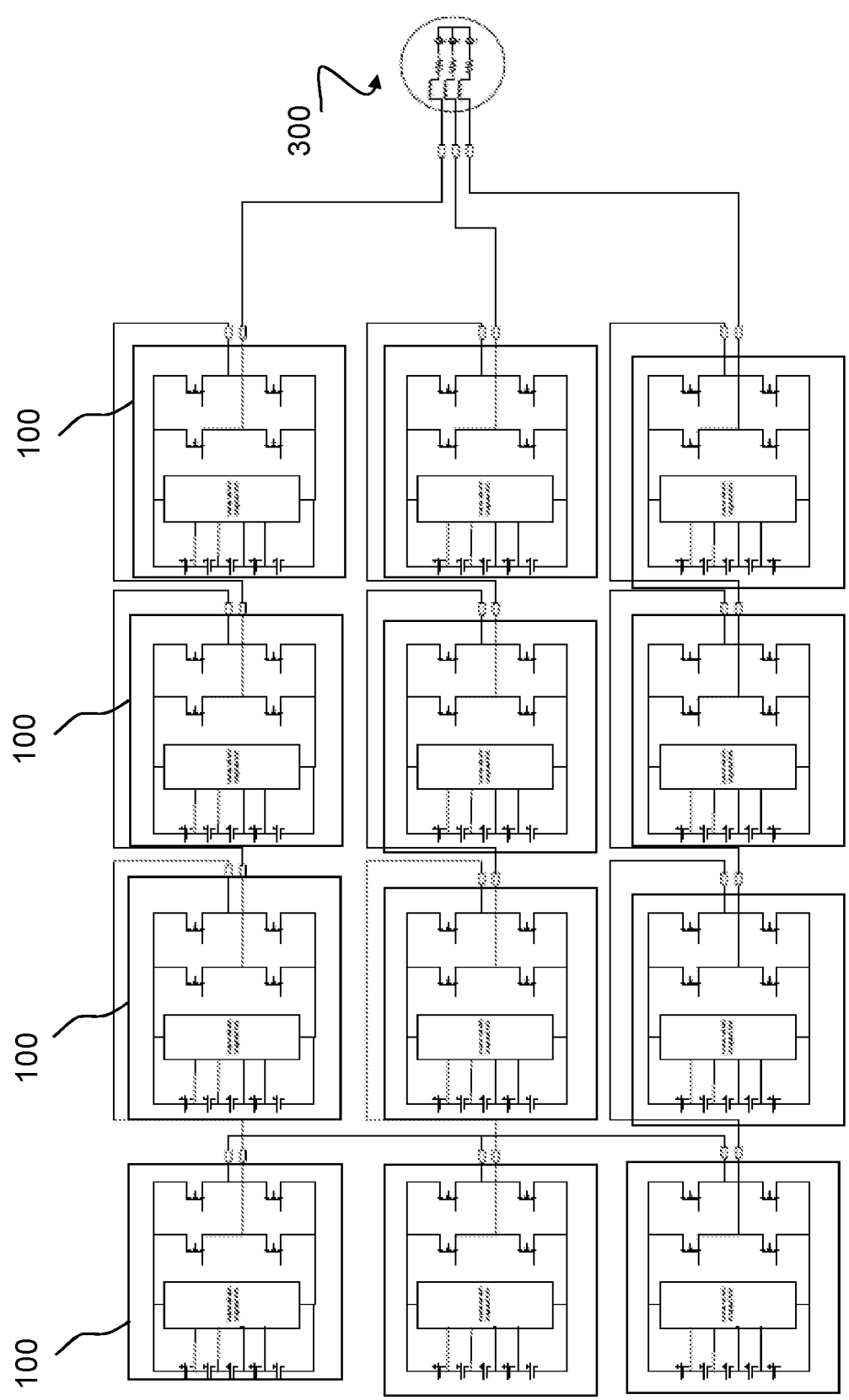
FIG. 2 shows a schematic of an example system comprising a plurality of units such as those shown in FIG. 1 coupled in series to operate an electric machine.

FIG. 1 and FIG. 2 illustrate embodiments of the present disclosure which may include control logic for controlling a string cell inverter. The string cell inverter may comprise a plurality of interchangeable units such as those described above, which may be arranged in series to provide the functionality of a string cell inverter. In some embodiments, the control logic is configured to receive signals comprising information based on at least one of battery data and demand for power, and control the AC output of each respective interchangeable unit of the string cell inverter based on the at least one of battery data and demand for power. In some embodiments the string cell inverter is coupled to a multi-phase AC electric motor, and the control logic is configured to send signals to each of the interchangeable units based on the desired torque of the multi-phase AC electric motor to control the output of AC power from each of the interchangeable units.

Figure 7:
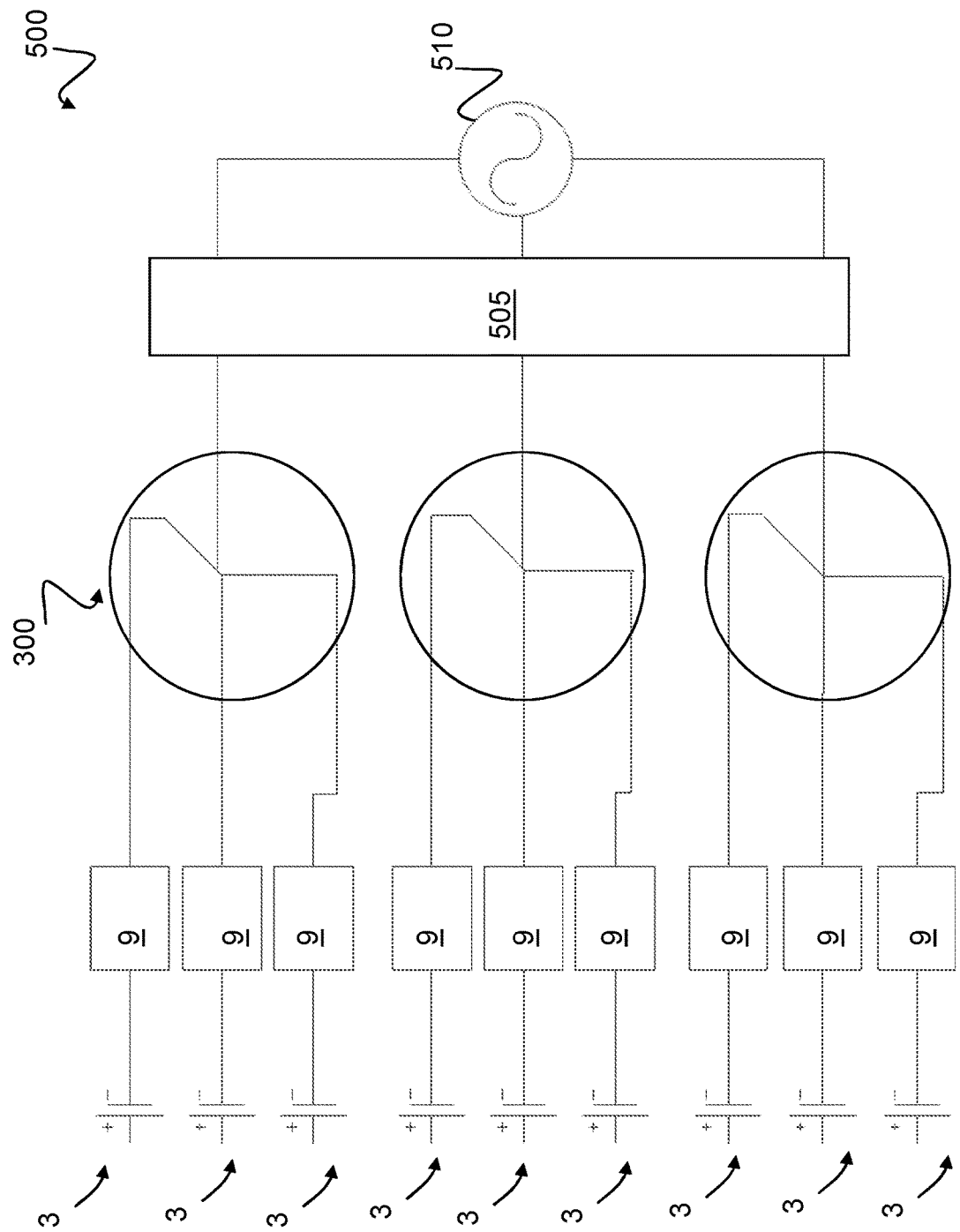
FIG. 7 shows an example apparatus for charging a plurality of batteries.

Some embodiments of the disclosure provide an apparatus 500 comprising a connection 505 for coupling a plurality of sets of multi-phase windings 300 to a multi-phase AC power coupling 510, such as shown in FIG. 7. The multi-phase AC power coupling may be a multi-phase AC power supply, for example a power network such as the National Grid. The multi-phase windings 300 may be induction windings. The multi-phase windings 300 may be provided by the electric machine described above and in more detail below, such as an electric motor. The connection 505 is arranged so that each set of multi-phase windings is couplable to a respective corresponding phase of the AC power coupling 510. Each phase of each set 300 is couplable to a respective corresponding inverter 9, and each inverter 9 is couplable to a respective corresponding battery 3 so that at least one separate battery-inverter pair is couplable by the connection 505 to the respective corresponding phase of the AC power coupling 510 via the corresponding phase of its set 300. Such embodiments of the disclosure may allow effective charging of batteries 3 from an AC power source by using the sets of multi-phase windings 300 as low-pass filters. Each battery-inverter pair may be provided by one of the interchangeable units 100 described above and in more detail below.

Figure 8:
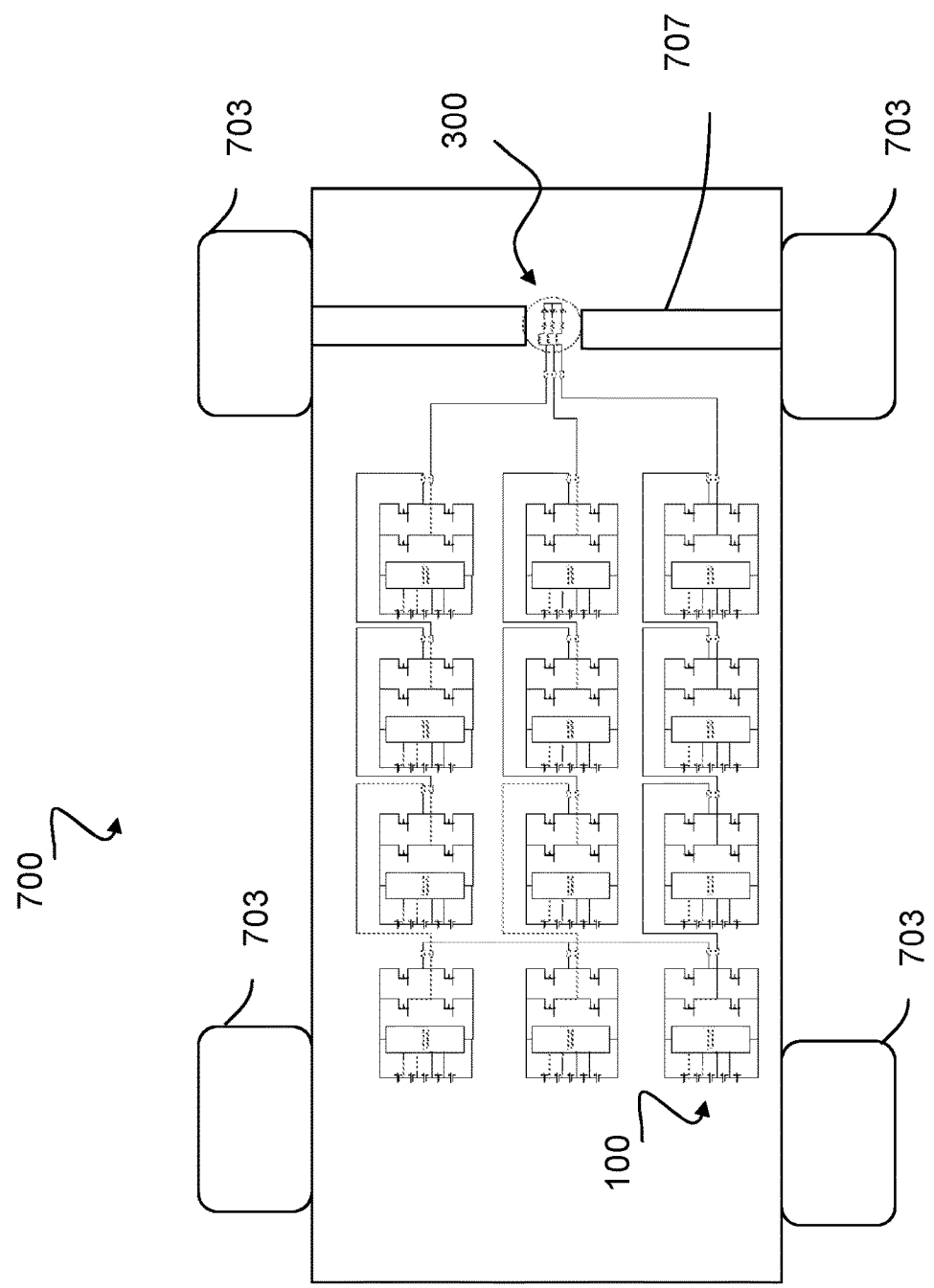
FIG. 8 shows an example complex product comprising a plurality of units, such as those shown in FIGS. 1, 5 and 6, arranged to provide a string cell inverter.

Some embodiments of the disclosure provide an electric vehicle 700, as shown in FIG. 8. The electric vehicle 700 comprises a plurality of batteries 3 each comprising at least one energy storage cell, a multi-phase AC electric motor 300, and a plurality of string cell inverters. Each respective string cell inverter comprises a plurality of inverter units 100 arranged to be coupled to control the output of the plurality of batteries 3 to a respective phase of the AC electric motor 300.

Some embodiments of the disclosure provide a method of installing an inverter into a complex product comprising an electric machine requiring an AC power supply, and wherein the complex product comprises a plurality of separate compartments. The complex product may be the electric vehicle, as shown in FIG. 8. The electric machine may be the electric machine described above and in more detail below, such as an electric motor. The method comprises distributing a plurality of inverter units 100 around the plurality of separate compartments of the complex product, and coupling the plurality of inverter units together for providing power to the electric machine.

Some embodiments of the disclosure provide a plurality of interchangeable units arranged to provide a string cell inverter for powering an electric machine. The interchangeable units may be the units described above and described in more detail below. The electric machine may be the electric machine described above and in more detail below, such as an electric motor. Each interchangeable unit comprises a housing carrying an AC output, a battery comprising at least one battery cell, a battery management system configured to control charge supplied to and/or from the at least one battery cell of a battery, and a respective inverter. Each interchangeable unit is configured to be coupled in series via its AC output so as to provide a string cell inverter for supplying AC power from the battery. The apparatus comprises a cooling circuit configured to route coolant via each of the plurality of interchangeable units.

Some embodiments of the disclosure also provide a method of installing an inverter into a complex product comprising an electric machine requiring an AC power supply. The complex product may be the electric vehicle 700 shown in FIG. 8. The electric machine may be the electric machine described above and in more detail below, such as an electric motor. Each inverter comprises a housing carrying an AC output, an inverter for supplying AC power via the AC output. The housing carries a coolant inlet port and a coolant outlet port. The method comprises coupling the AC output of each inverter together to the electric machine, and coupling the coolant inlet port and the coolant outlet port of each inverter together to provide a cooling circuit to route coolant via each of the plurality of inverters.

Examples of the present disclosure allow AC power to be delivered to and/or from a plurality of batteries in a more efficient and controlled way. Because each of the units comprises a battery, a battery management system and an inverter in a common housing, each of the units may be interchangeable and easily swapped in or out. Furthermore, because a plurality of units may be coupled together, the power rating of the components of each unit, and in particular the power rating of the inverter and the VCIs of each unit, may be lower thus allowing cheaper components to be used. The units can also be distributed among compartments of the complex product around the complex product to make more efficient use of space and distribute weight more evenly.

To put these embodiments into context, the following disclosure introduces example apparatus in which they may be used. These apparatus happens to employ example configurations, and these are advantageous, but other configurations may also be used.

Figure 6:
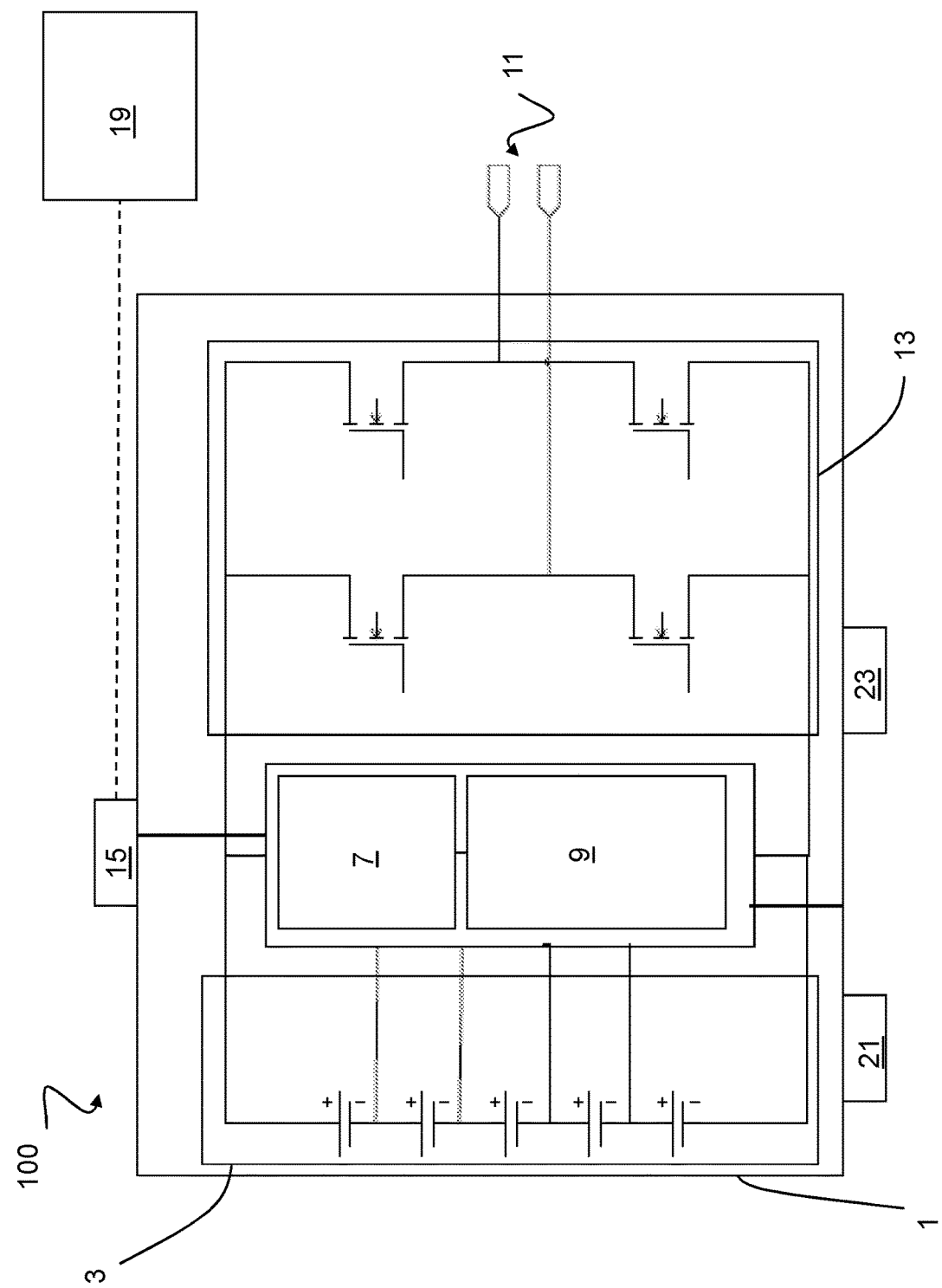
FIG. 6 shows a schematic of another example unit for installation in a complex product.

FIG. 1 shows an example unit 100 for installation in a complex product comprising an electric machine requiring an AC power supply. In the example shown in FIG. 1, the unit 100 comprises a housing 1 carrying an AC output 11. In some examples the housing 1 is a closed container which may be sealed, and may comprise ports for various connections (as described in more detail below) to the components inside the housing 1. The housing 1 may be regularly shaped or irregular in shape. Inside the housing 1 is a battery 3 comprising five battery cells and a controller 5, although in other examples (such as shown in FIG. 6) a controller 5 is not required. The controller 5 may be provided by control logic. The controller 5 is coupled to a battery management system 7 and an inverter 9.

The inverter 9 comprises four voltage controlled impedances, VCIs, 13 arranged in an H-bridge. The VCIs each comprise two main connections and a control connection. A voltage applied to the control connection can control the impedance of a conduction path between the two main connections. The H-bridge may be provided as part of an integrated circuit.

In the example shown in FIG. 1, the H-bridge comprises four such VCIs 13 arranged to provide two inverter legs— each leg of the H-bridge comprises two VCIs. In each leg, a first main connection of each VCI is coupled to a different one of two DC energy supply rails, and the second main connection of each VCI is coupled to the other VCI of that leg and to the AC output of the inverter. The AC output 11 is thus provided between the legs of the H-bridge between the VCIs 13—the AC output 11 may comprise one terminal coupled to one leg of the H-bridge, and another terminal coupled to the other leg of the H-bridge.

In the example shown in FIG. 1, the housing 1 also carries a timing signal input 15 coupled to the controller 5. The timing signal input 15 is couplable to a remote device 19, such as the controller 5 of another similar unit 100. In the example shown in FIG. 1, the housing 1 also carries a DC input 17 for coupling to a DC power supply from outside the housing 1, although in other examples (such as shown in FIG. 6 described in more detail below) the DC input 17 is not required.

The battery cells of the battery 3 are coupled to the battery management system 7. The battery management system 7 may comprise VCIs arranged to allow electrical power from the battery cells to be dissipated to balance the cells (not shown in FIG. 1, but given reference number 25 in FIG. 5). In the example shown, the inverter 9 and battery management system 7 are integrated onto a single printed circuit board and share the same single integrated microcontroller, although in other examples the inverter 9 and battery management system 7 may be provided by two separate microcontrollers and/or may be provided on separate printed circuit boards. In some examples the VCIs 13 of the inverter 9 may be provided on a separate printed circuit board to the battery management system 7 to aid in heat dissipation from the VCIs 13.

The housing 1 is configured to encapsulate the unit 100 for installation into the complex product. For example, the housing 1 is configured to protect the inverter 9, battery 3 and battery management system 7 from water ingress.

The unit 100 is configured so that a plurality of units 100 can be coupled together to provide the AC power supply for the electric machine. For example, the AC output 11 may comprise two terminals. The first terminal of the AC output 11 of a first unit 100 may be configured to couple to a second unit 100, and the second terminal to and a third unit 100. Additionally or alternatively, the first terminal of the AC output 11 of a first unit 100 may be configured to couple to an electric machine and the second terminal to a second unit 100.

The battery management system 7 is configured to balance a state of charge of each of the cells of the battery 3. For example, the battery management system is configured to control charge supplied to and/or from the battery cells of the battery 3. For example, the battery management system 7 may be configured to control the current to a cell of the battery 3 based on the voltage of that cell. For example, if the voltage of a cell reaches a selected threshold, the current supplied to that cell may be restricted to limit the charge supplied to that cell. This may be done by modulating the impedance of a VCI 25 coupled in parallel with the cell which is to be controlled. For example, if the VCI 25 impedance is dropped, current may discharge from the cell through the VCI 25. Additionally or alternatively, the battery management system 7 may be configured to move charge from one cell of a battery 3 to another cell of the same battery 3, and/or to cells of batteries 3 of other units 100. In some examples the determination of whether to move charge from the battery 3 of one unit 100 to the battery 3 of another unit may be made by control logic 19.

The inverter 9 is configured to provide a power supply to the AC output 11 based on energy from the battery 3 by controlling the VCIs 13. As described above, the VCIs 13 forming the H-bridge are operable to control the flow of current through them, for example they may act as switches. Accordingly, the VCIs 13 may be switched between a conducting and non-conducting state by the application of a control voltage as described below.

By adjusting the impedance of the VCIs 13 the output of the H-bridge (and hence the AC output 11) can be switched from one direction (polarity) to the opposite direction. In addition, by appropriate control of the VCIs 13 it can be seen from FIG. 1 that the AC output voltage can also be set to zero.

The timing signal input 15 is configured to receive a timing signal from the remote device 19 outside the housing 1. The timing signal input 15 is coupled to control the impedances of the VCIs 13 of the inverter 9 so that changes in the impedances of the VCIs 13 can be synchronised with the timing signal, for example so that the impedances of the VCIs 13 change in phase with the timing signal. This coupling may be direct, or it may be mediated by the controller 5.

Adjusting the impedance of a VCI 13 may comprise adjusting the control voltage of the VCIs 13. The control voltage may be obtained from a DC power supply, for example via DC input 17, and operated by the controller 5 to control the VCIs 13. This may enable the VCIs 13 to be operated in synchrony with a timing signal received via the timing signal input. For example the control voltage applied to the VCIs may be synchronised to the timing signal—for example, the timing signal may comprise a series of pulses, and the controller 5 may apply a series of corresponding pulses of the control voltage to the VCIs 13. These control pulses may be synchronised to the timing signal—e.g. each control pulse may be triggered by a rising or falling edge of that timing signal.

The timing signal input 15 may also be operable to act as a communications interface, for example to send information such as battery data to the remote device 19.

In the example shown in FIG. 1 the controller 5 is configured to control at least one of the plurality of VCIs 13 of the inverter 9 based on the timing signal received via the timing signal input 15, although in other embodiments (such as shown in FIG. 6) the controller 5 and/or the DC input 17 is not essential and the unit 100 may operate without a controller 5 or a DC input 17 and with the timing signal input 15 coupled to provide a control voltage which itself controls the impedances of the inverter VCIs 13.

In the example shown in FIG. 1, the controller 5 is configured to operate the VCIs 13 of the inverter 9 based on the timing signal using the DC power supply received via the DC input 17. In the example shown in FIG. 1, the battery management system 7 is configured to control the at least one VCI of the battery management system 7 using the DC power supply, for example the battery management system 7 is configured to balance charge between the plurality of battery cells of the battery 3 by operating the at least one VCI of the battery management system 7 using the DC power supply. For example, the at least one VCI of the battery management system 7 may be operated to divert charge, such as current, away from a cell, for example to a resistor or to another cell or another battery 3.

In the example shown in FIG. 1, the controller 5 is configured to send signals to a remote device 19 based on at least one of: a temperature of the battery management system 7; a temperature of the battery 3; the temperature of the inverter 9; a current supplied to and/or from the battery 3; and a voltage of the battery 3.

In the example shown, the timing signal is sent from the remote device 19 that receives the signals sent by the controller 5. The remote device 19 may, for example, be a control logic 19, as described in more detail below.

FIG. 2 shows one way to couple a set of units 100 such as those shown in FIG. 1. Each unit 100 is configured to couple to another unit 100 to provide a string cell inverter, as shown in FIG. 2. Each of the units 100 may be interchangeable in the sense that any one of the units 100 may be replaced by another—each unit 100 provides similar, for example the same, functionality. In some examples, each unit 100 may be identical. The AC output 11 of each unit 100 is configured to be couplable to at least one of another unit 100 and an electric machine 300, for example as shown in FIG. 2 and as described above.

In the example shown in FIG. 2, the electric machine 300 comprises a multi-phase AC electric motor 300. In the example shown, four units 100 are coupled together in series via their AC outputs 11 to form a string of units 100, although of course more or less units 100 may be coupled in this way. The string of units 100 may act to provide a string cell inverter (also known as a chain cell inverter). For example, a plurality of units 100 may be coupled in series and/or in parallel. Coupling the units 100 in parallel may increase the current output of the string of units 100.

In the example shown in FIG. 2, a separate string of units 100 (for example a set of series coupled units 100) is coupled to each phase of the multi-phase electric motor 300. Because the electric motor 300 shown in FIG. 2 is a three phase motor, three strings are provided, one for each phase of the electric motor 300. At the back of the string, an output of the last unit 100 of each string is coupled to the AC output 11 of one unit 100 of each of the other strings, so that each string is coupled to a reference voltage.

A single remote device 19, such as a control logic 19, is configured to communicate with each of the units 100, for example via the timing signal input 15, to receive signals comprising information based on at least one of battery data of each interchangeable unit 100, and demand for power of a string cell inverter. The control logic 19 is configured to process the received signals and may be configured to store data based on the received signals in a memory.

Additionally or alternatively, the control logic 19 may be configured to receive a demand for power from elsewhere, for example the demand for power may be controlled by a user operating the complex product. In some examples the demand for power may be proportional to a depression of a trigger or pedal, such as a gas pedal in a vehicle. In some examples the demand for power may be a demand for torque, for example a demand for torque of an electric motor.

In the example shown in FIG. 2, the control logic 19 is configured to send a timing signal to control operation of each respective interchangeable unit 100. The control logic 19 is configured to determine the phase timing of the AC output 11 of each respective interchangeable unit 100 to meet the demand for power.

Figure 3:
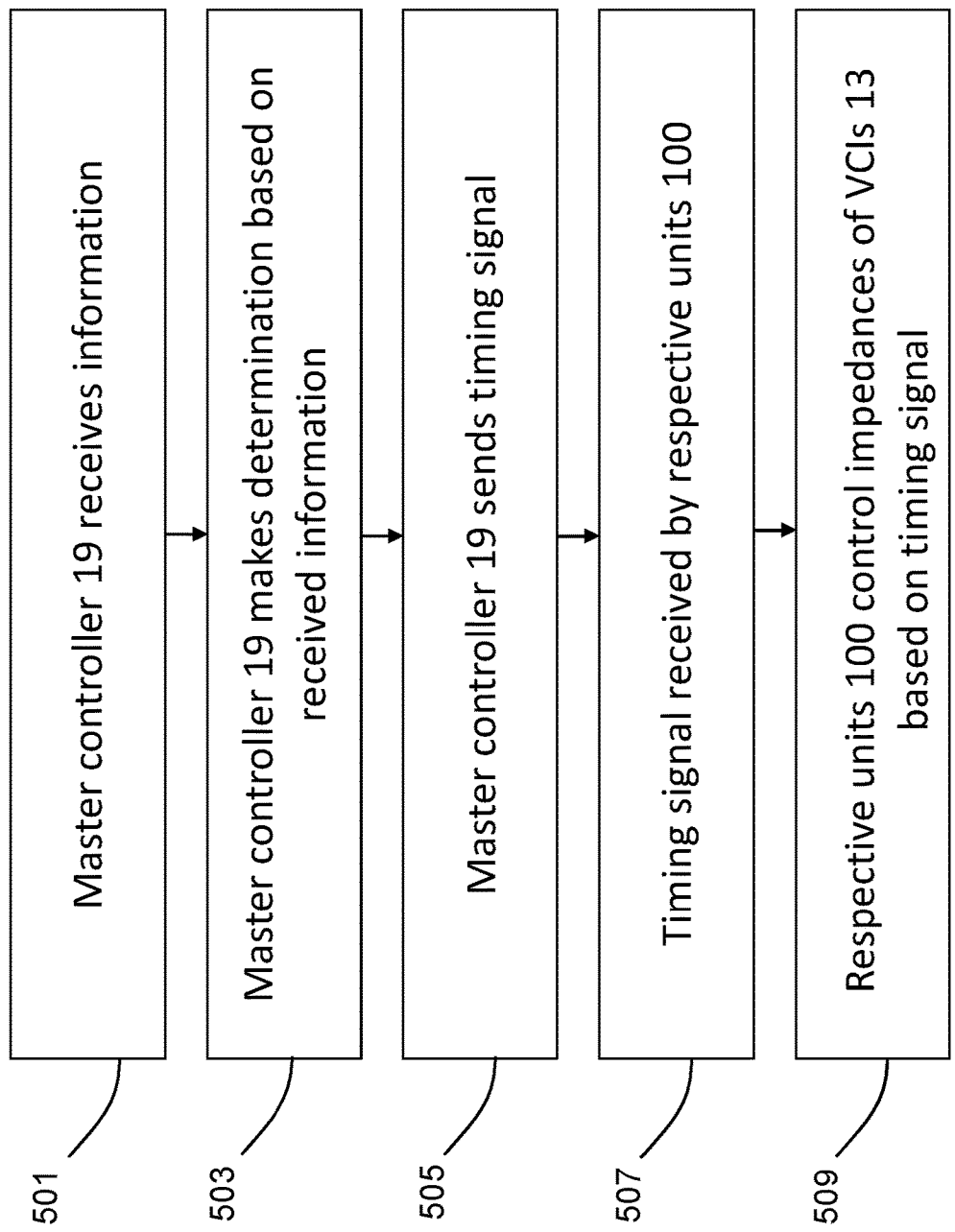
FIG. 3 shows a flowchart illustrating the steps of operating a unit, such as the unit shown in FIG. 1.

An example flowchart illustrating the steps of operating a unit 100 of a string shown in FIG. 2 is shown in FIG. 3. In operation, the control logic 19 receives 501 information based on at least one of battery data of each interchangeable unit 100, a desired torque, and a demand for power of a string cell inverter. The control logic 19 makes a determination 503 based on this information to determine the phase timing of the AC output 11 of each respective interchangeable unit 100. For example, the control logic 19 may make a determination 503 based on the battery data or the demand for power, or a combination of both. Additionally or alternatively, the control logic 19 may make a determination 503 based on a desired torque output of an electric motor.

The control logic 19 sends 505 the timing signal to control operation 509 of each respective interchangeable unit 100. The timing signal received by a respective unit 100 may be unique to that unit 100, and/or unique to that string, for example a separate timing signal may be sent for each string corresponding to a separate phase of the electric motor 300. In some examples the control logic 19 sends 505 the timing signal directly to each interchangeable unit 100, for example in parallel, and in other examples the control logic 19 sends the timing signal to a plurality of units 100 in series, for example to the units 100 of a string in series, so that all the units 100 of the string receive the same timing signal from the control logic 19. The timing signal may comprise information unique to each unit 100, so that if the timing signal is sent to a plurality of units 100 in series in a string, each individual unit 100 may still be operated independently of the other units 100 in that string.

The timing signal is received 507 by the timing signal input 15 of each respective unit 100 and causes changes in impedances of the VCIs 13 of the inverter 9 to be synchronised with the timing signal. By changing the impedance of the VCIs 13 of the inverter 9, the power output of that respective unit 100 can be adjusted. For example, by adjusting the impedance of two of the VCIs 13 of the H-bridge of the inverter 9 at a time, the AC output of a unit 100 can be switched from, for example, −1V to 0V and +1V. Additionally or alternatively, pulse width modulation, PWM, may be used, to further alter the output of that unit 100.

Figure 4:
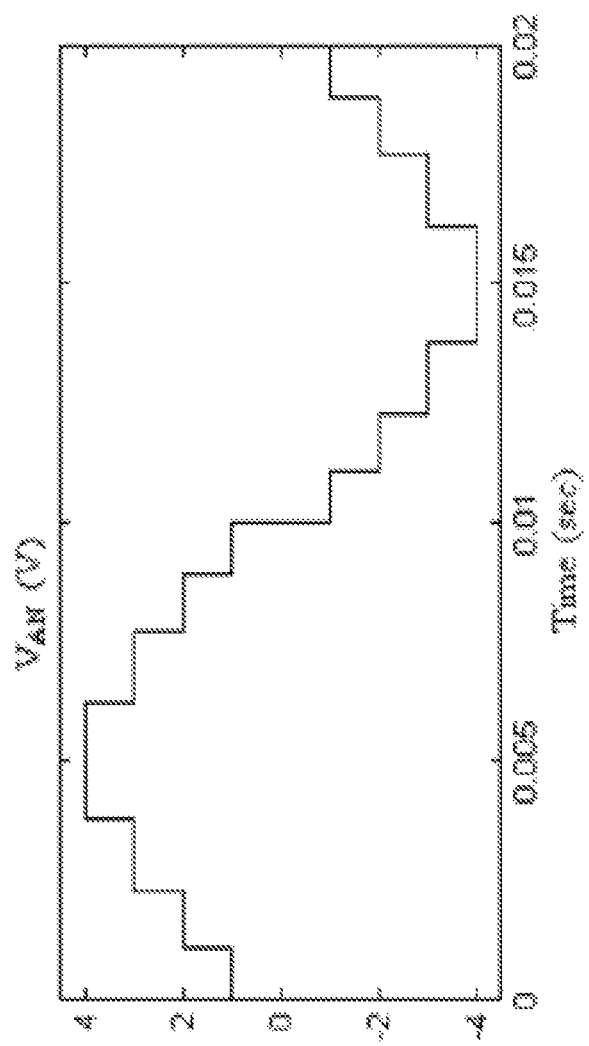
FIG. 4 shows an example output from a system comprising a plurality of units such as those shown in FIG. 1 coupled in series.

FIG. 4 shows an example output of a string of units 100, such as that shown in FIG. 2, for powering one of the phases of the electric motor 300. FIG. 4 shows the voltage output of a string of units 100 as a function of time. Each step change in the voltage output represents at least one impedance of the VCIs 13 of the inverter 9 of one of the interchangeable units 100 changing. Because there are four individual units 100 in a string in FIG. 2, and each unit can provide an output of +1V, 0V and −1V, there are four steps up to +4V and four steps down to −4V from 0V. In this way, the steps up and down can be used to provide an AC output from a DC source (for example a battery), for example by approximating the characteristic sinusoidal waveform of an AC supply. The voltage output from each unit 100 is staggered with respect to the AC output from the other units 100 of the same string so that a series of steps up and down over time is produced. Providing more units 100 per string may allow smaller steps up and down and therefore an improved AC output that more closely follows a desired sinusoidal waveform. Pulse width modulation, PWM, may also be used to provide smaller steps up and down.

The impedance of the VCIs 13 of each unit 100 is synchronised to the timing signal. For example, the impedance of the VCIs 13 may be synchronised to change state in sync with the timing signal. The timing signal may be a repeating/cyclical signal. The impedance of the VCIs 13 may be synchronised to every cycle of the timing signal, to a selected number of cycles of the timing signal, or as a function of the timing signal. The timing signal may therefore be at a frequency greater or less than that of the AC output 11 of a unit 100 and/or a string of units 100. For example, a timing signal may be provided for every step change in Voltage indicated in FIG. 4—in other words, a change in impedance of a VCI 13 of one of the units 100 may be matched to the frequency of the timing signal. In other examples, a change in impedance of a VCI 13 of a unit 100 may occur as a function of the timing signal—for example, the impedance of a VCI 13 may change after a selected delay following receipt of the timing signal.

The voltage controlled impedances described herein may comprise transistors such as insulated gate bipolar transistors, IGBTs, field effect transistors, FETs, such as junction field effect transistors, JFETS, insulated gate field effect transistors, IGFETS, metal oxide semiconductor field effect transistors, MOSFETs, and any other type of transistor. The VCIs may be operated as switches. Electromechanical switches such as relays may be used, for example in some low-speed high-voltage applications. In some examples the H-bridge may be provided by a relay, such as a double pole double throw relay. In some examples a double pole double throw relay may be used in combination with a VCI. IGBTs and similar type VCIs may be used in the inverter whereas FETs may be used by the battery management system.

In some examples, the timing signal may at least partially define at least one of a frequency and a phase of the power supply to the AC output 11 of a unit 100. For example, the impedance of the VCIs 13 may be synchronised to the timing signal so that the frequency of the power supply provided by the AC outputs 11 of a string cell inverter 9 is matched to the frequency of the timing signal.

As noted above, the timing signal may be unique to that unit 100, or unique to a string of units 100. For example, the timing signal of one string of units 100 may be out of phase with the timing signal of another string of units 100, to provide a multi-phase AC power supply.

In some examples the timing signal may comprise a clock signal and a data signal. For example, the control logic 19 may send a clock signal (for example a cyclic or repeating signal), and additionally send a data signal comprising information about when the impedances of the VCIs 13 of a particular unit 100 should be controlled with respect to the clock signal. For example, the same clock signal may be sent to all units 100 with the data signal comprising information about when the impedances of the VCIs 13 of each unit 100 should change with respect to the clock signal. In some examples the control logic 19 may send the timing signal and clock signal as separate signals, and, for example, at separate times or at the same time. Splitting the timing signal into a data signal and a clock signal may reduce the bandwidth of the timing signal.

The control logic 19 may be configured to stagger the output of each of the respective units 100 of a string with respect to each other. In some examples a separate control logic 19 is provided for each string of units 100. In some examples, the control logic 19 is configured to control the AC output 11 of each respective interchangeable unit 100 of a string cell inverter based on the at least one of battery data and demand for power, or a combination of both. In other examples, the control logic 19 is configured to send signals to each of the interchangeable units 100 based on the desired torque of the multi-phase AC electric motor 300 to control the output of AC power from each of the interchangeable units 100.

The battery data may comprise at least one of: an energy state of the battery 3; a state of charge of the battery 3; a voltage of the battery 3; a current output of the battery 3; the capacity of the battery 3; a temperature of the battery 3. The demand for power may be determined based on a desired torque of the AC electric motor 300. The battery data may be stored in the control logic 19, for example in a memory of the control logic 19. The battery data may be periodically updated, for example the battery data may be updated when a change in the battery data reaches or passes a selected threshold.

In some examples, the control logic 19 is configured to control the AC output 11 of a first one of the interchangeable units 100 based on the battery data of a second one of the interchangeable units 100. For example, the control logic 19 may be configured to increase or decrease the AC output of one interchangeable unit 100 based on the battery data of another interchangeable unit 100 so as to meet the demand for power. In some examples, the control logic 19 is configured to balance the energy stored across interchangeable units 100, for example across interchangeable units 100 of the same string.

In some examples, the control logic 19 may be configured so that the determination made at determination step 503 of FIG. 3 comprises determining the demand placed on the power output 11 of each respective interchangeable unit 100 so that the sum of the AC power outputs 11 of the interchangeable units 100 meets the demand for power. In some examples, the control logic 19 is configured to determine the demand placed on the power output 11 of an interchangeable unit 100 based on that interchangeable unit's battery state of charge. For example, the control logic 19 may make a determination that a unit's battery state of charge is low. The control logic 19 may therefore adjust the timing signal sent to each of the respective units 100 of a string so that the power demand placed on that particular unit 100 is reduced, and the power demand on a unit 100 with a greater battery state of charge may be increased to match the power demand for that string.

In some examples, the control logic 19 may be configured to determine the demand placed on the power output 11 of each respective interchangeable unit 100 based on other battery data, such as an energy state of the battery 3, a state of charge of the battery 3, a voltage of the battery 3, a current output of the battery 3, the capacity of the battery 3, and a temperature of the battery 3. The control logic 19 may use the battery data in combination with the demand for power, for example from a string as a whole, or from a plurality of strings, to determine the demand placed on the power output 11 of each respective interchangeable unit 100. For example, if the temperature of a battery 3 of a selected unit 100 is indicated to be high or low, for example outside a selected range, then the control logic 19 may be configured to place a lower power demand on that unit 100 to avoid damaging the battery, or to place a lower power demand on a string containing that unit 100. A similar consideration may be made if the temperature of the inverter 9 or battery management system 7 is too high or too low.

The control logic 19 may further be configured to not draw any power at all from a unit where the temperature is outside a second selected range. If a lower power demand 100 is placed on a particular unit 100, the control logic 19 may be configured to meet the power demand by demanding more power from another unit 100. Additionally or alternatively, if a lower power demand 100 is placed on a particular unit 100, the control logic 19 may be configured to provide a lower total power output, for example the power output from a string may be reduced. Limiting the total power output in this way may prevent damage to any of the units 100.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit. For example the function of the battery management system 7, the controller 5 and the inverter 9 comprising the VCIs 13, may be integrated into a single functional unit, such as a single integrated microcontroller.

In some examples, such as shown in FIG. 5, the housing 1 does not comprise a timing signal input 15. In such examples the controller 5 may control the timing of changes in impedance of the VCIs 13 of the inverter 9. For example, the controller 5 may be pre-programmed with a timing sequence for controlling the impedances of the VCIs 13 of the inverter 9. If the units 100 of FIG. 5 are coupled to provide a string cell inverter, then each unit 100 of that string may be pre-programmed with a different timing sequence.

In some examples, for example as shown in FIG. 6, the housing 1 carries a coolant inlet port 21 and a coolant outlet port 23. The coolant inlet port 21 and the coolant outlet port 23 may be coupled via a cooling circuit in the housing 1 configured to route coolant into the housing 1, via at least one of the inverter 9 and the battery 3, and out of the housing 1. A plurality of units 100 may be coupled together so that the coolant ports 21, 23 of one unit 100 are coupled to the coolant ports 21, 23 of the other units 100 to provide a cooling circuit around the plurality of units 100. For example, the units 100 providing a string of a string cell inverter may be coupled together to provide a cooling circuit for that string.

In some examples, the control logic 19 may be the controller 5 of another interchangeable unit 100. This avoids the need for providing a separate unit for the control logic 19.

In some examples, the battery cells of the battery 3 may be replaced with other forms of energy storage cells or other DC energy storage, for example fuel cells such as Hydrogen fuel cells. The battery 3 may comprise a plurality of battery cells, such as five battery cells as shown in FIGS. 1, 5 and 6, or more or less battery cells, for example only one battery cell.

In some examples, each of the units 100 of a string of units 100 may be configured to operate in a positive or negative mode. For example, a family of units 100 may be configured to operate in a positive or negative mode. For example, a family of units 100 may be configured to provide a positive output, such as +1V, and a family of units 100 may be configured to provide a negative output, such as −1V. In this way, each family produces half of a wave cycle of an AC output.

The three phase system shown in FIG. 2 can be expanded to make a nine phase system. Each unit 100 of the nine phase system may use a single set of electronics comprising the inverter 9, the battery management system 5 and battery 3. Each of the units 100 of a string can be made to fit in a compact space so that they can distributed around a complex product such as a car more easily. For example, the housing 1 of the units 100 may be adapted to fit in different compartments of the complex product, for example the housing 1 may be configured to have an irregular shape.

Embodiments of the disclosure may also provide safety features such as redundancy for a system. For example, if all of the units 100 of a string are switched to short circuit their AC outputs 11, the highest voltage in a string would only by the voltage of a battery 3 of a unit 100. If a battery 3 fails then there is redundancy as the string of units 100 can continue to operate with N−1 units 100 working. If a battery 3 fails open circuit, the design of the H-bridge means that VCIs 13 of the inverter 9 are set to give zero output voltage and the string continues to operate with N−1 units 100 working.

Providing a string cell inverter using a plurality of units 100 described above may also offer additional advantages. For example, a typical voltage of the AC output 11 of one of the units 100 is 60V (this may be obtained by coupling a plurality of battery cells of lower voltage together in series—for example the voltage of a battery cell may be 3.6V, 3.9V or 4V, and 12 or 14 battery cells, for example, may be coupled in series). If a unit 100 in a string of such units 100 that are coupled in series fails, the maximum output of that string is only the voltage of one of the units, for example 60V. This compares to 300 to 600V in a standard inverter system commonly used in electric vehicles. Furthermore, because the VCIs 13 of each inverter 9 switch at a lower voltage than conventional inverters used in similar applications, the switching efficiency is improved due to lower voltage harmonics. Lossy emissions, for example from the VCIs 13, are also reduced due to the lower switching voltage.

Use of a plurality of units 100 coupled in series to provide a string also allows the VCIs 13 of the inverter 9 of each unit 100 to switch at a fundamental output frequency which is much lower than a typical pulse width modulation frequency conventionally used for inverters in similar applications. The pulse width modulation frequency may correspond to, or be a function of, the frequency of the timing signal. Reducing the frequency at which switching of the VCIs 13 occurs at reduces power losses from the VCIs 13.

Other embodiments of the disclosure provide a complex product comprising an electric machine requiring an AC power supply. The complex product comprises a plurality of units 100 such as those described above in relation to FIGS. 1, 5 and 6, wherein each of the units 100 are interchangeable with one another. The plurality of interchangeable units 100 may be distributed amongst different compartments of the complex product. The complex product may be an electric vehicle.

Some embodiments of the disclosure relate to a method for the provision of AC power, for example performed by the control logic 19 discussed above. The interchangeable units 100 may be the interchangeable units 100 discussed above in relation to FIGS. 1, 5 and 6. The method comprises receiving 501 information based on at least one of: battery data of an interchangeable unit 100; a desired torque; and a demand for power, for example of a unit 100 and/or of a string of units 100 arranged to provide a string cell inverter. The method further comprises determining 503 based on this information the phase timing of an AC output 11 of each respective interchangeable unit 100; and sending 505 a timing signal to control operation 509 of each respective interchangeable unit 100.

FIG. 7 shows an example apparatus 500. The apparatus comprises a connection 505 for coupling a plurality of sets 300 of multi-phase windings to a multi-phase AC power coupling 510. Each set 300 of multi-phase windings may comprise motor windings. For example, each set 300 of multi-phase windings may be an electric machine 300, for example an electric motor such as that described above, for example a three phase electric motor. The multi-phase AC power coupling 510 may be an AC source, such as a multi-phase AC power supply, for example a power network such as the National Grid.

The apparatus 500 is arranged so that each set 300 of windings is coupled to a respective corresponding phase of the AC power coupling 510. Each phase of each set 300 of windings is coupled to a respective corresponding inverter 9, and each inverter 9 is coupled to a respective corresponding battery 3 so that at least one separate battery-inverter pair is couplable by the connection to the respective corresponding phase of the AC power coupling 510 via the corresponding phase of its set 300. The battery-inverter pair may be provided by an interchangeable unit 100, such as the interchangeable units 100 described above. The apparatus may further comprise control logic 19, such as the control logic 19 described above, coupled to each of the inverters 9.

The inverters 9 are configured to be operated to provide DC power to each respective battery 3 from the multi-phase AC power coupling 510. The inverters 9 may be configured to balance the current supplied to each phase of each set 300. For example, the inverters 9 may be configured to balance the current supplied to each phase of each set 300 by selecting the currents supplied to each phase of each set 300 so that the sum torque on the motor windings of a set 300 is zero.

The inverters 9 may be configured to select the current supplied to each phase of a set 300 based on battery data. The battery data may comprise at least one of a temperature of a battery management system 7, a temperature of a battery 3, a temperature of the inverter 9, a current supplied to and/or from a battery 3, and energy level of a battery 3, a state of charge of a battery 3, and a voltage of a battery 3. For example, the inverters 9 may be configured to select the current supplied to each phase of a set 300 based on an energy storage state of the most depleted battery 3 coupled to the set 300.

If the apparatus comprises control logic 19, the control logic 19 may be configured to determine a characteristic of each battery 3, the characteristic comprising at least one of a temperature of the battery 3, a state of charge of the battery 3 and a voltage of the battery 3. The control logic 19 may be configured to determine a desired recharge current for each battery 3 based on the determined characteristic.

The apparatus described above in relation to FIG. 7 may be used in a method to transfer energy between the AC power coupling 510 and a plurality of batteries 3. The method comprises providing a connection 505 for coupling a plurality of sets of multi-phase windings 300 to a multi-phase AC power coupling 510. The method may comprise operating the inverters 9 to provide DC power to each respective battery 3. Additionally or alternatively, the method may comprise operating the inverters 9 to deliver AC power to the AC power coupling 510, for example from the batteries 3. This may be desirable, for example, to sell power back to a grid as part of a "feed-in" tariff, for example. The operation of the inverters 9 may be performed by control logic 19.

In some examples, operating the inverters 9 comprises operating the inverters 9 to balance the current supplied to each phase of each set 300. In examples where the windings comprise motor windings, operating the inverters 9 to balance the current supplied to each phase of each set 300 comprises selecting the currents so that the sum torque on the motor windings of a set 300 is zero, for example so that the motor is stationary during charging of the batteries 3.

In some examples the inverters 9 coupled to a particular set are coupled between a reference voltage and each corresponding phase, for example as shown in FIG. 2 and as described above. The reference voltage may be an earth. Balancing the current may comprise balancing the voltages across the inverters 9 coupled to the particular set 300.

In some examples, operating the inverters 9 to provide DC power to each respective battery comprises determining a characteristic of each battery 3, the characteristic comprising at least one of a temperature of the battery 3, a state of charge of the battery 3 and a voltage of the battery 3. Operating the inverters 9 may comprise determining the desired recharge current for each battery 3 based on the determined characteristic. In some examples where the multi-phase windings are motor windings, balancing the current supplied to each phase of each set 300 of multi-phase windings comprises balancing the current so that the sum torque on each multi-phase AC electric motor is zero.

FIG. 7 shows an example electric vehicle 700. The electric vehicle 700 may comprise a plurality of units 100 arranged to provide a string cell inverter, for example such as described above in relation to FIG. 2.

The electric vehicle 700 shown in FIG. 7 comprises a plurality of batteries 3 each comprising at least one energy storage cell, a multi-phase AC electric motor 300, and a plurality of string cell inverters. Each string cell inverter comprises a plurality of units 100, for example such as the units 100 described above, arranged in series. For example, each unit 100 may comprise housing 1 carrying a timing signal input 11. Inside the housing 1 there may be a battery 3, a battery management system 7, a controller 5 and an inverter 9 comprising VCIs 13. A battery management system 7 comprising at least one VCI 25 may also be housed inside the housing 1 of each unit 100.

Each string of units 100 is coupled to a respective phase of the multi-phase electric motor 300. The electric motor 300 is coupled to a drivetrain 707 coupled to the wheels 703 of the electric vehicle.

In some examples, the electric vehicle 700 comprises a plurality of separate compartments distributed around the electric vehicle 700. The units 100 of each string may be housed in the plurality of separate compartments, for example one unit 100 may be housed per compartment, or a plurality of units 100 may be housed in a single compartment. The shape of the housing 1 of each unit 100 may be adapted to fit in the compartments of the electric vehicle 700. In some examples, the units 100 are interchangeable. In some examples respective batteries 3 are held in separate units 100. The units 100 may be coupled to control logic 19, such as the control logic 19 described above. The control logic 19 may be configured to control operation of each of the units 100 in a manner similar to that described above in relation to FIGS. 2 and 3. For example, the control logic 19 may be configured to control operation of VCIs 13 of the inverter 9 using a timing signal.

Each respective string is arranged to be coupled to control the output of the plurality of batteries 3 to a respective phase of the AC electric motor 300. In the example shown in FIG. 8, each respective string of units 100 is configured to control a respective phase of the AC electric motor.

In embodiments where a battery management system 7 is present, the battery management system may be configured to control charge supplied to and/or from an energy storage cell of the battery 3, for example using at least one battery management system VCI 25 in a manner such as that described above.

To operate the electric vehicle 700, the control logic 19 may control the plurality of units 100 forming a string in a manner such as that described above in relation to FIGS. 2 and 3. For example, the control logic 19 may provide a timing signal to control operation of the VCIs 13 of each unit 100. The control logic 19 may make a determination of a demand for power from each unit 100 based on a desired torque of the electric motor 300, for example by operation of a switch or pedal by a user.

As described above, a plurality of units 100 may be arranged to provide a string cell inverter. A string of units 100 may be arranged to provide a string cell inverter for each phase of a multi-phase electric machine such as an electric motor. The string cell inverter may be referred to as an inverter. The inverter may be installed into a complex product such as the electric vehicle described above in relation to FIG. 8. The electric vehicle 700 may comprise a plurality of separate compartments distributed around the footprint of the electric vehicle 700. The plurality of separate compartments of the complex product may be irregular in shape. Each of the units 100 may be identical in shape and/or function, and therefore may be interchangeable.

The method of installation may comprise distributing a plurality of inverter units 100 around the plurality of separate compartments of the complex product 700. The method may further comprise coupling the plurality of inverter units 100 together for providing power to the electric machine.

For example, the plurality of inverter units 100 may be coupled together in at least one of series (as shown in FIG. 8) and parallel. In some examples, a string of units 100 may comprise units 100 coupled in series and in parallel, for example to increase the current output from a string.

Coupling the plurality of inverter units together may comprise coupling the inverter units 100 together to provide a multi-phase string cell inverter for powering the electric machine 300.

FIG. 6 shows an interchangeable unit 100 that may be arranged to provide a string cell inverter for powering an electric machine 300, such as shown in FIGS. 2 and 8. The interchangeable units 100 may comprise the features of any of the interchangeable units 100 described above. Each interchangeable unit 100 comprises a housing 1 carrying an AC output 11, a battery 3 in the housing comprising at least one battery cell, a battery management system 7 in the housing 1, and a respective inverter 9 in the housing 1. The housing 1 may also carry a timing signal input 15 coupled to control logic 19, such as described above in relation to FIG. 1.

Figure 9:
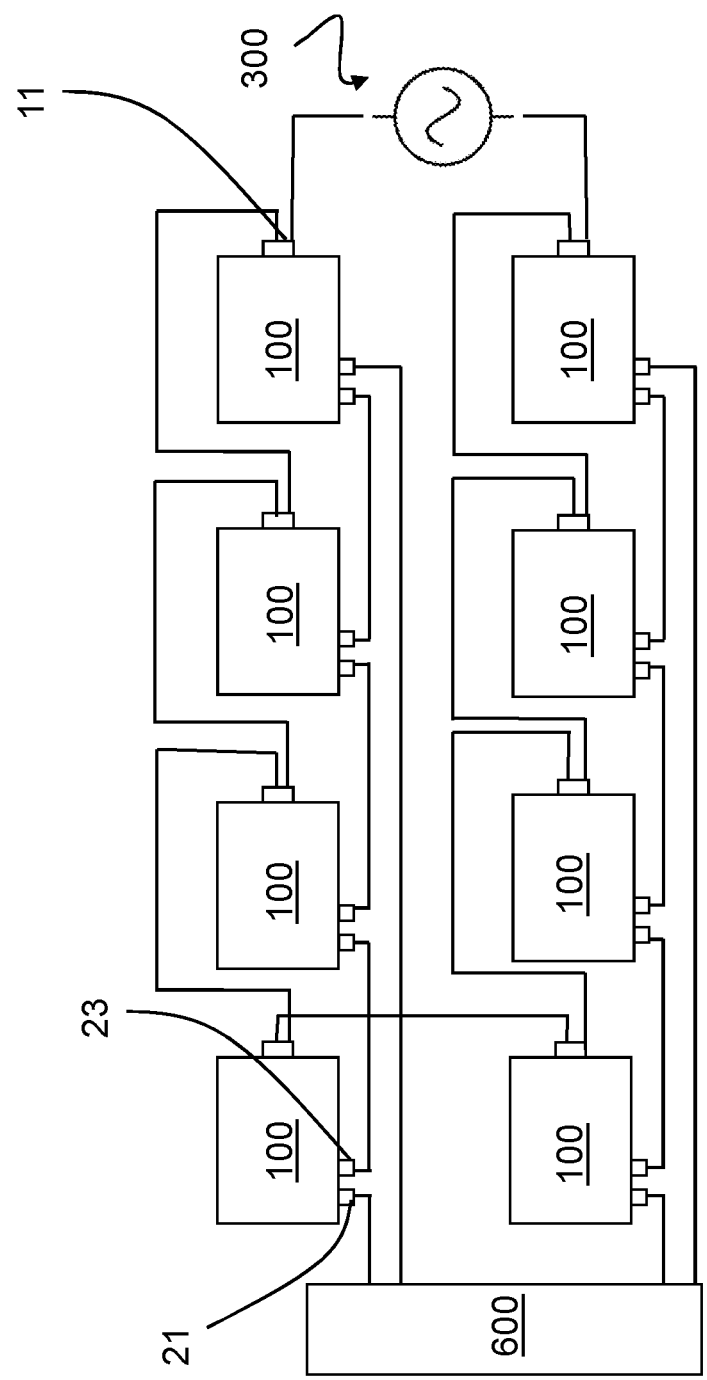
FIG. 9 shows a cooling circuit for routing cooling around a plurality of units such as those shown in FIG. 6.

The housing 1 of each respective interchangeable unit 100 carries a coolant inlet port 21 and a coolant outlet port 23. Between the coolant inlet port 21 and the coolant outlet port 23 is a coolant circuit inside the housing 1. The coolant circuit may route coolant via components of the unit 100 in the housing 1, such as the battery 3, the battery management system 7, including a battery management system VCI 25 and/or the inverter 9, including the inverter VCIs 13. The coolant inlet port 21 and the coolant outlet port 23 may be coupled to the coolant inlet 21 and coolant outlet ports 23 of other respective units 100 via a cooling circuit outside the units 100, as shown in FIG. 9. For example, the cooling circuit may route coolant around different compartments of a complex product such as an electric vehicle 700 described above and as shown in FIG. 8.

The cooling circuit may route coolant via a plurality of units 100 in series and/or in parallel. In the example shown in FIG. 9, the coolant circuit routes coolant via four units 100 in series. The coolant outlet port 23 of one unit 100 feeds the coolant inlet port 21 of another unit 100. In the example shown in FIG. 9 there are two cooling circuits, one for each string of units 100. The coolant circuit may be coupled to a heat sink to dissipate heat, such as a radiator 600 as illustrated in FIG. 9. The heat sink may comprise a pump. The heat sink and/or the pump may be coupled to control logic 19 (not illustrated in FIG. 9).

Each interchangeable unit 100 is configured to be coupled in series via its AC output 11 so as to provide a string cell inverter for supplying AC power from the battery 3, such as described above in relation to FIG. 2. The cooling circuit is configured to route coolant via each of the plurality of interchangeable units 100. The cooling circuit is configured to route coolant from outside the housing 1 of each respective interchangeable unit 100, via both the battery 3 and the inverter 9 inside the housing 1, and back outside the housing 1.

In use, the cooling circuit is operated, for example using a pump, to pump coolant around the plurality of interchangeable units 100. The pump may be part of the heat sink, such as the radiator 600 illustrated in FIG. 9. Operation of the pump may be controlled by the control logic 19. The rate of flow of coolant may be based on at least one of battery data, a demand for power and a demand for torque, for example the rate of flow of coolant may be based on the power demand placed on a unit 100, or on a plurality of units 100 such as a string of units 100. For example, the control logic 19 may make a determination of the flow rate based on at least one of battery data, a demand for power and a demand for torque. For example, the control logic 19 may determine that the rate of flow of coolant increases in proportion to the power demand of a string of units 100 shown in FIG. 2.

In operation, as illustrated in FIG. 9, the cooling circuit routes coolant from one unit 100 to the next 100, and routes the coolant from outside the housing 1, around components of the unit 100 such as the battery 3, a VCI 25 of the battery management system 7 and the inverter 9 VCIs 13, and back out of the housing 1. The cooling circuit may then route that coolant in series to another unit 100, or back to a coolant reservoir and/or a radiator such as the radiator 600 shown in FIG. 9 to dissipate heat transferred to the coolant.

As described above in relation to FIG. 7, the apparatus 500 shown in FIG. 7 may be used to charge a plurality of batteries 3. Also described herein is another method for charging a plurality of batteries 3. The method may comprise coupling each of a plurality of sets of multi-phase induction windings 300 to a respective phase of a multi-phase AC power supply 510. Each phase of each set of multi-phase AC induction windings 300 is coupled to a respective phase of the AC power supply 510 and to a respective at least one inverter 9. Each at least one inverter 9 is coupled to a respective at least one battery 3, for example to form a battery-inverter pair. The method comprises operating each respective at least one inverter 9 coupled to each phase of each set of multi-phase induction windings 300 to provide DC power to each respective at least one battery 3.

Also described herein is an apparatus for controlling an AC electric motor. The apparatus comprises a plurality of inverters having AC outputs arranged in series to provide a string cell inverter. The string cell inverter is configured to couple to the AC electric motor. The apparatus also comprises control logic, which may act as a master controller. The control logic is configured to control each of the inverters. The control logic is configured to control operation of each inverter of the string cell inverter based on a desired torque output of the AC electric motor. Each inverter may carried in a separate housing.

The plurality of inverters may be provided by a plurality of interchangeable units, each interchangeable unit comprising a battery inside a housing comprising at least one battery cell, and a battery management system inside the housing for controlling charge supplied to and/or from the at least one battery cell of the battery. Each interchangeable unit may carry a communication interface configured to send and receive signals to the master controller. Each interchangeable unit may carry a controller in the housing configured to control the AC power supply of each inverter based on a timing signal received from the master controller via the communication interface. One of the interchangeable units may be configured to provide the functionality of the control logic acting as the master controller.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The control logic 5, 19 and the controllers, and any of the other activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. If the control logic 5, 19 comprises a memory the memory may be volatile or non-volatile, and may include programmable digital logic (e.g., a field programmable gate array (FPGA), an erasable programmable read only memory (EPROM), an electrically erasable programmable read only memory (EEPROM)), flash memory, optical disks, CD-ROMs, DVD ROMs, magnetic or optical cards, other types of machine-readable mediums suitable for storing electronic instructions, or any suitable combination thereof

The invention claimed is:

1. A unit for installation in a complex product comprising an electric machine requiring an AC power supply, the unit comprising:
   a housing carrying an AC output;
   a battery in the housing comprising at least one battery cell;
   an inverter in the housing, the inverter comprising a plurality of voltage controlled impedances, VCIs, for providing a power supply to the AC output based on energy from the battery;
   wherein the housing carries a timing signal input configured to receive a timing signal from outside the housing; and
   wherein the timing signal input is coupled to control the VCIs so that changes in the impedances of the VCIs are synchronised with the timing signal.

2. The unit of claim 1 comprising a battery management system in the housing for controlling charge supplied to and/or from the at least one battery cell of the battery.

3. The unit of claim 1 configured so that changes in the impedances of the VCIs are synchronised with corresponding falling or rising edges of the timing signal.

4. The unit of claim 1 wherein the apparatus comprises a controller in the housing configured to control at least one of the plurality of VCIs of the inverter based on the timing signal.

5. The unit of claim 4 wherein the controller is configured to send signals to a remote device based on at least one of: a temperature of the battery management system; a temperature of the battery; a temperature of the inverter; a current supplied to and/or from the battery; and energy level of the battery; a state of charge of the battery; and a voltage of the battery, wherein the timing signal is sent from the remote device that receives the signals sent by the controller.

6. The unit of claim 4, wherein the housing carries a DC input for coupling to a DC power supply from outside the housing;
   and wherein the controller is configured to operate the at least one VCI based on the timing signal using the DC power supply.

7. A complex product comprising an electric machine requiring an AC power supply comprising a plurality of units according to claim 1, wherein each of the units are interchangeable with one another.

8. The complex product of claim 7 wherein the plurality of interchangeable units are distributed amongst different compartments of the complex product.

9. An electric vehicle comprising a plurality of units according to claim 1.

10. A string cell inverter comprising a plurality of units according to claim 1.

11. A control logic for controlling a string cell inverter, the string cell inverter comprising a plurality of interchangeable units, each interchangeable unit housing:
   a battery comprising at least one battery cell;
   a battery management system for controlling charge supplied to and/or from the at least one battery cell of the battery; and
   an inverter for supplying AC power to an AC output carried by the unit based on energy from the battery;
   wherein the control logic is configured to receive signals comprising information based on at least one of battery data of each interchangeable unit, and demand for power of the string cell inverter; and wherein the control logic is configured to control the AC output of each respective interchangeable unit of the string cell inverter based on the at least one of battery data and demand for power.

12. The control logic of claim 11 wherein the control logic is configured to at least one of:
control the AC output of a first one of the interchangeable units based on the battery data of a second one of the interchangeable units;
increase or decrease the AC output of one interchangeable unit based on the battery data of another interchangeable unit so as to meet the demand for power; or
balance the energy stored across interchangeable units.

13. The control logic of claim 11 wherein the control logic is configured to send a timing signal to control operation of each respective interchangeable unit.

14. The control logic of claim 11 wherein the string cell inverter is configured to provide power to an AC electric motor and wherein the demand for power is determined based on a desired torque of the AC electric motor.

15. The control logic of claim 11 wherein the control logic is configured to send signals to each of the interchangeable units based on battery data from at least one of the interchangeable units.

16. The control logic of claim 11 wherein the inverter comprises a plurality of VCIs for providing a power supply to the AC output, and wherein the control logic is configured to send signals to each of the interchangeable units in the form of a timing signal to control the impedances of the VCIs so that changes in the impedances of the VCIs are synchronised with the timing signal.

17. A complex product comprising an electric machine requiring an AC power supply comprising the control logic of claim 11.

18. A control logic for controlling AC power supplied to each phase of a multi-phase AC electric motor from a plurality of interchangeable units;
wherein each interchangeable unit comprises:
an AC output;
a battery comprising at least one battery cell;
a battery management system configured to control charge supplied to and/or from the at least one battery cell of a battery; and
an inverter for supplying AC power to the AC output based on energy from the battery; and
wherein the control logic is configured to send signals to each of the interchangeable units based on the desired torque of the multi-phase AC electric motor to control the output of AC power from each of the interchangeable units.

19. The control logic of claim 18 wherein the control logic is configured to send balancing signals to each of the interchangeable units to balance the energy stored across the plurality of interchangeable units.

* * * * *